United States Patent
Evans

(10) Patent No.: US 7,197,648 B2
(45) Date of Patent: Mar. 27, 2007

(54) SECURE VIDEO CARD METHODS AND SYSTEMS

(75) Inventor: Glenn F. Evans, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/044,765

(22) Filed: Jan. 27, 2005

(65) Prior Publication Data

US 2005/0160285 A1    Jul. 21, 2005

Related U.S. Application Data

(63) Continuation of application No. 10/052,840, filed on Jan. 16, 2002.

(51) Int. Cl.
*G06F 11/00*   (2006.01)
*G06F 12/14*   (2006.01)
*H04L 9/32*    (2006.01)

(52) U.S. Cl. .................. 713/189; 713/193; 380/52

(58) Field of Classification Search .............. 713/189, 713/193; 380/200
See application file for complete search history.

(56) References Cited

U.S. PATENT DOCUMENTS

| | | | |
|---|---|---|---|
| 4,757,534 A | 7/1988 | Matyas et al. | |
| 4,962,533 A | 10/1990 | Krueger et al. | |
| 5,297,206 A | 3/1994 | Orton | |
| 5,379,344 A | 1/1995 | Larsson et al. | |
| 5,537,467 A | 7/1996 | Cheng et al. | |
| 5,572,235 A | 11/1996 | Mical et al. | |
| 5,577,125 A | 11/1996 | Salahshour et al. | |
| 5,727,062 A | 3/1998 | Ritter | |
| 5,881,287 A | 3/1999 | Mast | |
| 5,898,779 A | 4/1999 | Squilla et al. | |
| 5,963,909 A | 10/1999 | Warren et al. | |
| 6,044,182 A | 3/2000 | Daly et al. | |
| 6,047,342 A | 4/2000 | Depew | |
| 6,055,314 A | 4/2000 | Spies et al. | |
| 6,064,739 A * | 5/2000 | Davis | 380/200 |
| 6,072,873 A | 6/2000 | Bewick | |
| 6,115,819 A | 9/2000 | Anderson | |
| 6,330,624 B1 * | 12/2001 | Cromer et al. | 710/37 |
| 6,408,390 B1 | 6/2002 | Saito | |
| 6,421,733 B1 * | 7/2002 | Tso et al. | 709/246 |

(Continued)

FOREIGN PATENT DOCUMENTS

WO    WO 02/25416    3/2002

OTHER PUBLICATIONS

Choudhury et al., "Copyright Protection for Electronic Publishing Over Computer Networks" IEEE Network, May/Jun. 1995, pp. 12-20.

(Continued)

*Primary Examiner*—Gilberto Barron
*Assistant Examiner*—Samson Lemma

(57) ABSTRACT

Methods and systems for protecting data that is intended for use and processed on video or graphics cards are described. In one embodiment, a video card comprises a graphics processor unit (GPU) for processing data that is to be rendered on a monitor. The GPU comprises encryption and decryption functionality sufficient to encrypt and decrypt data on the video card. Memory is operably associated with the GPU for holding data that is to be or has been processed by the GPU. The memory comprises protected and unprotected portions. A display converter is provided for converting digital data to analog signals for use in rendering the data on the monitor. A memory controller is configured to protect the protected portions of the video memory.

12 Claims, 9 Drawing Sheets

U.S. PATENT DOCUMENTS

| | | |
|---|---|---|
| 6,859,832 B1 | 2/2005 | Gecht et al. |
| 6,934,389 B2 | 8/2005 | Strasser et al. |
| 7,024,558 B1 | 4/2006 | Satake |
| 2002/0012432 A1 | 1/2002 | England et al. |
| 2002/0136408 A1 | 9/2002 | Garcia |
| 2002/0169979 A1* | 11/2002 | Zimmer ...................... 713/200 |
| 2005/0102264 A1 | 5/2005 | Nason et al. |
| 2005/0102266 A1* | 5/2005 | Nason et al. ................... 707/1 |
| 2005/0204165 A1 | 9/2005 | Nason et al. |
| 2006/0123248 A1 | 6/2006 | Porter et al. |

OTHER PUBLICATIONS

"High-Bandwidth Digital Content Protection System, Revision 1.0" Feb. 17, 2000. Intel Corporation, Hillsborom, OR. 97124, Retrieved from the Internet: http://www.digital-cp.com/data/HDCP10.pdf.

* cited by examiner

SECURE VIDEO CARD METHODS AND SYSTEMS

RELATED APPLICATIONS

This application is a continuation of and claims priority to U.S. application Ser. No. 10/052,840, filed on Jan. 16, 2002, the disclosure of which is incorporated by reference herein.

TECHNICAL FIELD

This invention relates to methods and systems for processing video data using video cards.

BACKGROUND

Typically, a content author, such as a movie studio or a user publishing content on the web, will publish video content that has restrictions on how users can view it. This content can typically be viewed or rendered on a computer such as a personal computer. A great deal of time, effort and money is spent each year by unscrupulous individuals and organizations trying to steal or otherwise inappropriately obtain such video content.

One of the points of attack can be the computer on which such video content is to be viewed or rendered. That is, rogue programs or devices can and often do try to inappropriately obtain video content once it has been received on a computer, such as a personal computer. Among other computer components, this attack can be waged against the video card that processes the video content and/or the bus that transports the video content to and from the video card.

FIG. 1 shows an exemplary video (or graphics) card 100 that includes a bus connector 102 that inserts into a port on a typical computer. Video card 100 also includes a monitor connector 104 (e.g. a 15-pin plug) that receives a cable that connects to a monitor. Video card 100 can include a digital video-out socket 106 that can be used for sending video images to LCD and flat panel monitors and the like.

The modern video card consists of four main components: the graphics processor unit (GPU) 108, the video memory 110, the random access memory digital-to-analog converter (RAMDAC) 112, and the driver software which can be included in the Video BIOS 114.

GPU 108 is a dedicated graphics processing chip that controls all aspects of resolution, color depth, and all elements associated with rendering images on the monitor screen. The computer's central processing unit or CPU (not shown) sends a set of drawing instructions and data, which are interpreted by the graphics card's proprietary driver and executed by the card's GPU 108. GPU 108 performs such operations as bitmap transfers and painting, window resizing and repositioning, line drawing, font scaling and polygon drawing. The GPU 108 is designed to handle these tasks in hardware at far greater speeds than the software running on the system's CPU. The GPU then writes the frame data to the frame buffer (or on-board video memory 110). The GPU greatly reduces the workload of the system's CPU.

The memory that holds the video image is also referred to as the frame buffer and is usually implemented on the video card itself. In this example, the frame buffer is implemented on the video card in the form of memory 110. Early systems implemented video memory in standard DRAM. However, this requires continual refreshing of the data to prevent it from being lost and cannot be modified during this refresh process. The consequence, particularly at the very fast clock speeds demanded by modern graphics cards, is that performance is badly degraded.

An advantage of implementing video memory on the video card itself is that it can be customized for its specific task and, indeed, this has resulted in a proliferation of new memory technologies: p1 Video RAM (VRAM): a special type of dual-ported DRAM, which can be written to and read from at the same time. It also requires far less frequent refreshing than ordinary DRAM and consequently performs much better;

Windows RAM (WRAM): as used by the Matrox Millennium card, is also dual-ported and can run slightly faster than conventional VRAM;

EDO DRAM: which provides a higher bandwidth than DRAM, can be clocked higher than normal DRAM and manages the read/write cycles more efficiently;

SDRAM: Similar to EDO RAM except the memory and graphics chips run on a common clock used to latch data, allowing SDRAM to run faster than regular EDO RAM;

SGRAM: Same as SDRAM but also supports block writes and write-per-bit, which yield better performance on graphics chips that support these enhanced features; and DRDRAM: Direct RDRAM is a totally new, general-purpose memory architecture which promises a 20-fold performance improvement over conventional DRAM.

Some designs integrate the graphics circuitry into the motherboard itself and use a portion of the system's RAM for the frame buffer. This is called "unified memory architecture" and is used for reasons of cost reduction only and can lead to inferior graphics performance.

The information in the video memory frame buffer is an image of what appears on the screen, stored as a digital bitmap. But while the video memory contains digital information its output medium—the monitor—may use analog signals. The analog signals require more than just an "on" or "off" signal, as it is used to determine where, when and with what intensity the electron guns should be fired as they scan across and down the front of the monitor. This is where RAMDAC 112 comes into play as described below. Some RAMDACs also support digital video interface (DVI) outputs for digital displays such as LCD monitors. In such configurations, the RAMDAC converts the internal digital representation into a form understandable by the digital display.

The RAMDAC plays the roll of a "display converter" since it converts the internal digital data into a form that is understood by the display.

Even though the total amount of video memory installed on the video card may not be needed for a particular resolution, the extra memory is often used for caching information for the GPU 108. For example, the caching of commonly used graphical items—such as text fonts and icons or images—avoids the need for the graphics subsystem to load these each time a new letter is written or an icon is moved and thereby improves performance. Cached images can be used to queue up sequences of images to be presented by the GPU, thereby freeing up the CPU to perform other tasks.

Many times per second, RAMDAC 112 reads the contents of the video memory, converts it into a signal, and sends it over the video cable to the monitor. For analog displays, there is typically one Digital-to-Analog Converter (DAC) for each of the three primary colors the CRT uses to create a complete spectrum of colors. For digital displays, the RAMDAC outputs a single RGB data stream to be interpreted and displayed by the output device. The intended result is the right mix needed to create the color of a single pixel. The rate at which RAMDAC 112 can convert the information, and the design of GPU 108 itself, dictates the range of refresh rates that the graphics card can support. The RAMDAC 112 also dictates the number of colors available in a given resolution, depending on its internal architecture.

The bus connector 102 can support one or more busses that are used to connect with the video card. For example, an Accelerated Graphics Port (AGP) bus can enable the video card to directly access system memory. Direct memory access helps to make the peak bandwidth many times higher than the Peripheral Component Interconnect (PCI) bus. This can allow the system's CPU to do other tasks while the GPU on the video card accesses system memory.

During operation, the data contained in the on-board video memory can be provided into the computer's system memory and can be managed as if it were part of the system's memory. This includes such things as virtual memory management techniques that the computer's memory manage employs. Further, when the data contained in the system's memory is needed for a graphics operation on the video card, the data can be sent over a bus (such as a PCI or AGP bus) to the video card and stored in the on-board video memory 110. There, the data can be accessed and manipulated by GPU 108 as described above.

When the data is transferred from the system memory to the video memory on the video card and vice versa, it is possible for PCI devices connected to the PCI bus to "listen" to the data as it is transferred. The PCI bus also makes the video memory "visible" to the rest of the system, as if it existed like system memory. As a result, it is possible for a PCI device to acquire the PCI bus and simply copy the contents of the video memory to another device. If the PCI device is synchronized with the incoming video, it could potentially capture all of the content.

There are two previous options to protect the content once it is in the video memory on the video card.

First, the video memory can remain accessible but the content is stored in a protected, encrypted form so that it is unreadable to rogue devices and applications. While this prevents the data from being read, it also requires that the data be continually maintained in an encrypted form. If the video card (i.e. the GPU) wishes to process the data, it must atomically decrypt on read, process and re-encrypt on every write back to the video memory. For video data, the decompressed data could require more than 300 mb per second just to display. Accordingly, the encryptor/decryptor would have to operate at these high data rates. Typically, several video streams will be processed into a single output stream. For example, picture-in-picture (PIP) or a multi-channel display would blend eight channels into a single display. This would require eight simultaneous decryptors and one encryptor running at 300 mb per second (a total of around 2.4 gigabytes per second). Thus, this approach is not very desirable due to the high computation requirements.

Second, the content or data in the video memory can simply be made inaccessible. This is typically not possible due to the design of the PCI and AGP buses, since the video memory is mapped into physical memory (i.e. it appears as if it is regular system memory). The video memory is thus accessible to any PCI device which can then acquire the PCI bus and perform the data transfer without the knowledge of the CPU. Thus, this approach is not very desirable since the memory controller (or GPU) cannot reliably determine who is accessing the memory.

Accordingly, this invention arose out of concerns associated with providing secure video processing systems and methods.

SUMMARY

Methods and systems for protecting data that is intended for use and processed on video or graphics cards are described. In one embodiment, a video card comprises a graphics processor unit (GPU) for processing data that is to be rendered on a monitor. The GPU comprises encryption and decryption functionality sufficient to encrypt and decrypt data on the video card. Memory is operably associated with the GPU for holding data that is to be or has been processed by the GPU. The memory comprises protected and unprotected portions. A display converter is provided for converting digital data to analog signals for use in rendering the data on the monitor. A memory controller is configured to protect the protected portions of the video memory.

DETAILED DESCRIPTION

Exemplary Computer System

Figure 2:
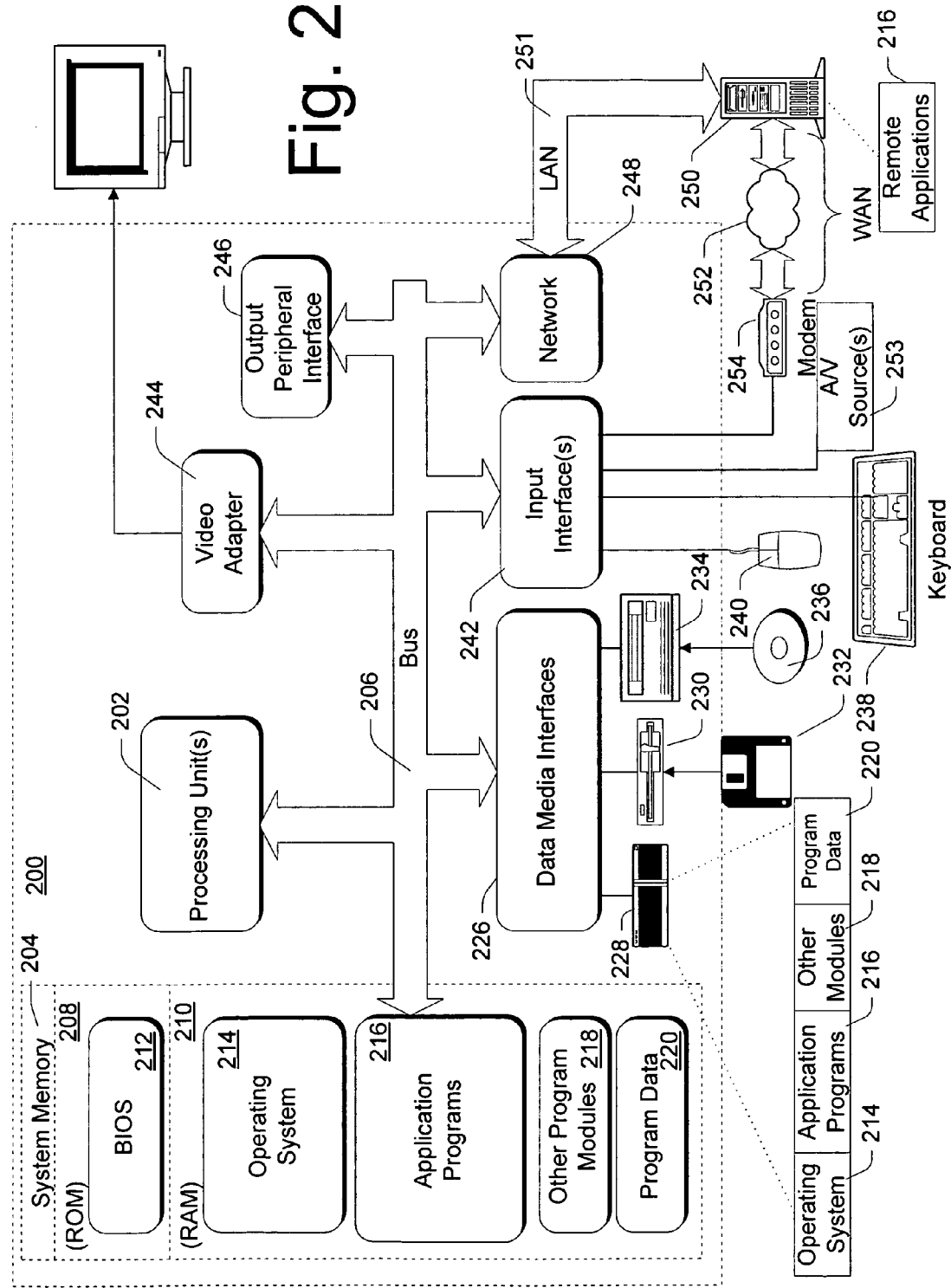
FIG. 2 is a block diagram of an exemplary computer system that can employ video cards in accordance with the described embodiment.

FIG. 2 illustrates an example of a suitable computing environment 200 on which the system and related methods described below can be implemented.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, main-frame computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2, computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. A user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter or video/graphics card 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer.

As shown in FIG. 2, computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Overview

In the embodiments described below, data that is intended for use by a video card can be encrypted such that anytime the data is provided onto a bus (e.g. the PCI or AGP bus) between the video card and the computer system, the data is encrypted. This is advantageous because snooping devices or rogue applications that acquire the bus cannot access the data in its unencrypted form. Thus, when data is moved from the video memory on the video card to the system's memory (e.g. when it is mapped to the system's physical memory) and vice versa, the data is in encrypted form and thus protected.

When the encrypted data is transferred from the system's memory to the video card for processing by the graphics processor unit (GPU), it can be decrypted and placed into protected memory on the video card. Thus, the GPU can perform operations on the unencrypted data—which is what the GPU is best suited to do.

In the embodiments described below, two specific implementations are described that are directed to protecting data by encrypting it whenever it is to travel on a bus between the video card and the computer system. It is to be appreciated and understood that the specifically described embodiments are but examples only and that variations can be made to the specific implementations without departing from the spirit and scope of the claimed subject matter.

Figure 3:
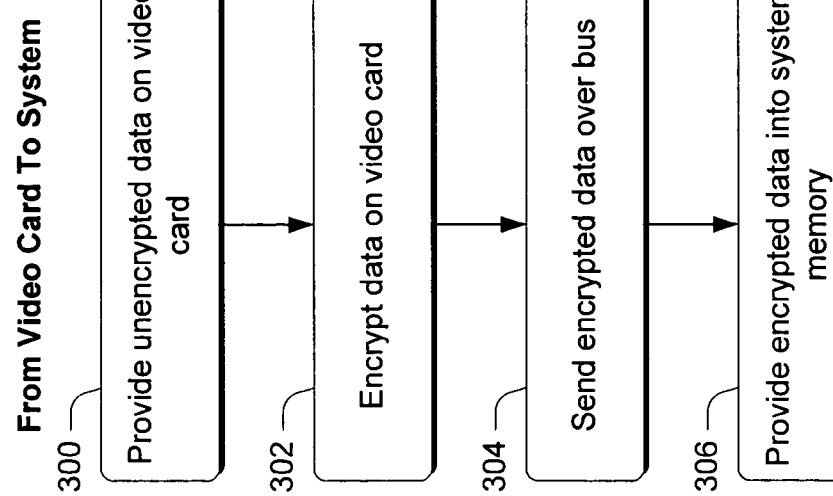
FIG. 3 is a flow diagram that describes steps in a method in accordance with one embodiment.

FIG. 3 is a flow diagram that describes steps in a method in accordance with one embodiment. This method can be implemented in any suitable hardware, software, firmware or combination thereof. In this particular example, the method describes exemplary processing steps that are performed when data is moved from the video card to the system or system memory.

Step 300 provides unencrypted data on the video card. This data is the data that is typically processed by the video card's GPU and is provided in the video card's memory. Step 302 encrypts the unencrypted data on the video card. This step can be implemented in response to a request to transfer the data to the system's memory. For example, the CPU may send an instruction to move the data from the video card to the system's memory. Alternately, the GPU may determine that it does not need the data any longer and therefore initiates a transfer to the system's memory. The data can be encrypted on the video card using any suitable encryption techniques. Step 304 then sends the encrypted data over a bus between the video card and the system. Exemplary buses can be the PCI bus and the AGP bus. Step 306 provides the encrypted data into system memory.

In the process described above, the data that moves from the video card to the system's memory is encrypted and thus, any snooping devices or rogue applications that attempt to acquire the bus and steal or copy the data will receive only encrypted data which, to the snooping devices or rogue applications, will be mathematically infeasible to decrypt.

Figure 4:
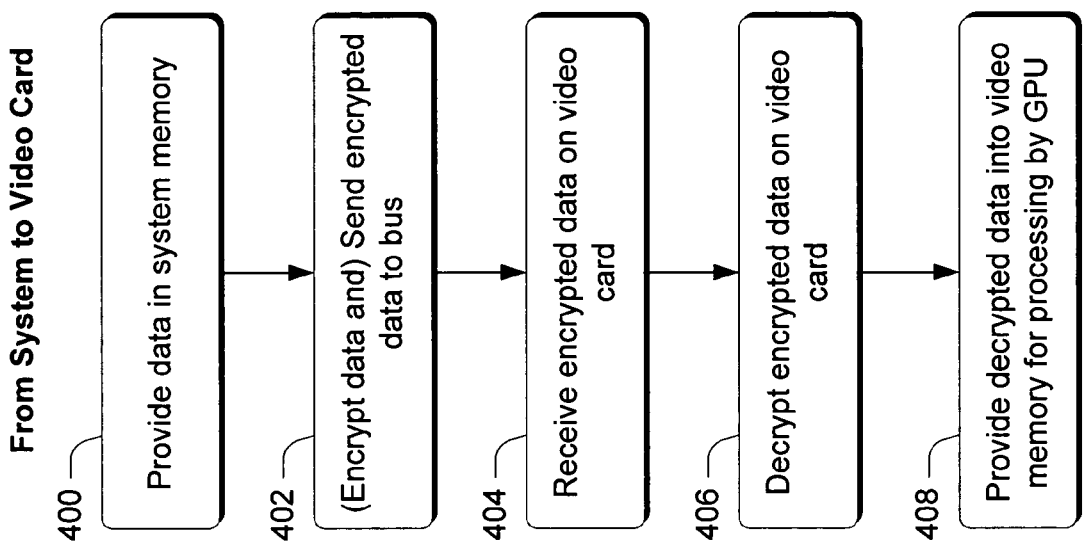
FIG. 4 is a flow diagram that describes steps in a method in accordance with one embodiment.

FIG. 4 is a flow diagram that describes steps in a method in accordance with one embodiment. This method can be implemented in any suitable hardware, software, firmware or combination thereof. In this particular example, the method describes exemplary processing steps that are performed when data is moved from the system or system memory to the video card.

Step 400 provides data in the system memory. Such data is typically data that is utilized by the video card for processing. The data can be provided in the system memory as either encrypted or unencrypted data. Step 402 can encrypt the data (if it is unencrypted in the system memory) and can send the data to a bus between the system memory and the video card. This step can be implemented in response to a desire to process the data on the video card. Step 404 receives the encrypted data on the video card. Step 406 then decrypts the encrypted data on the video card and step 408 provides the decrypted data into video memory for processing by the GPU.

In the process described above, the data that moves from the system's memory to the video card is encrypted and thus, any snooping devices or rogue applications that attempt to acquire the bus and steal or copy the data will receive only encrypted data which, to the snooping devices or rogue applications, will be mathematically infeasible to decrypt.

Exemplary First Video Card Embodiment

Figure 5:
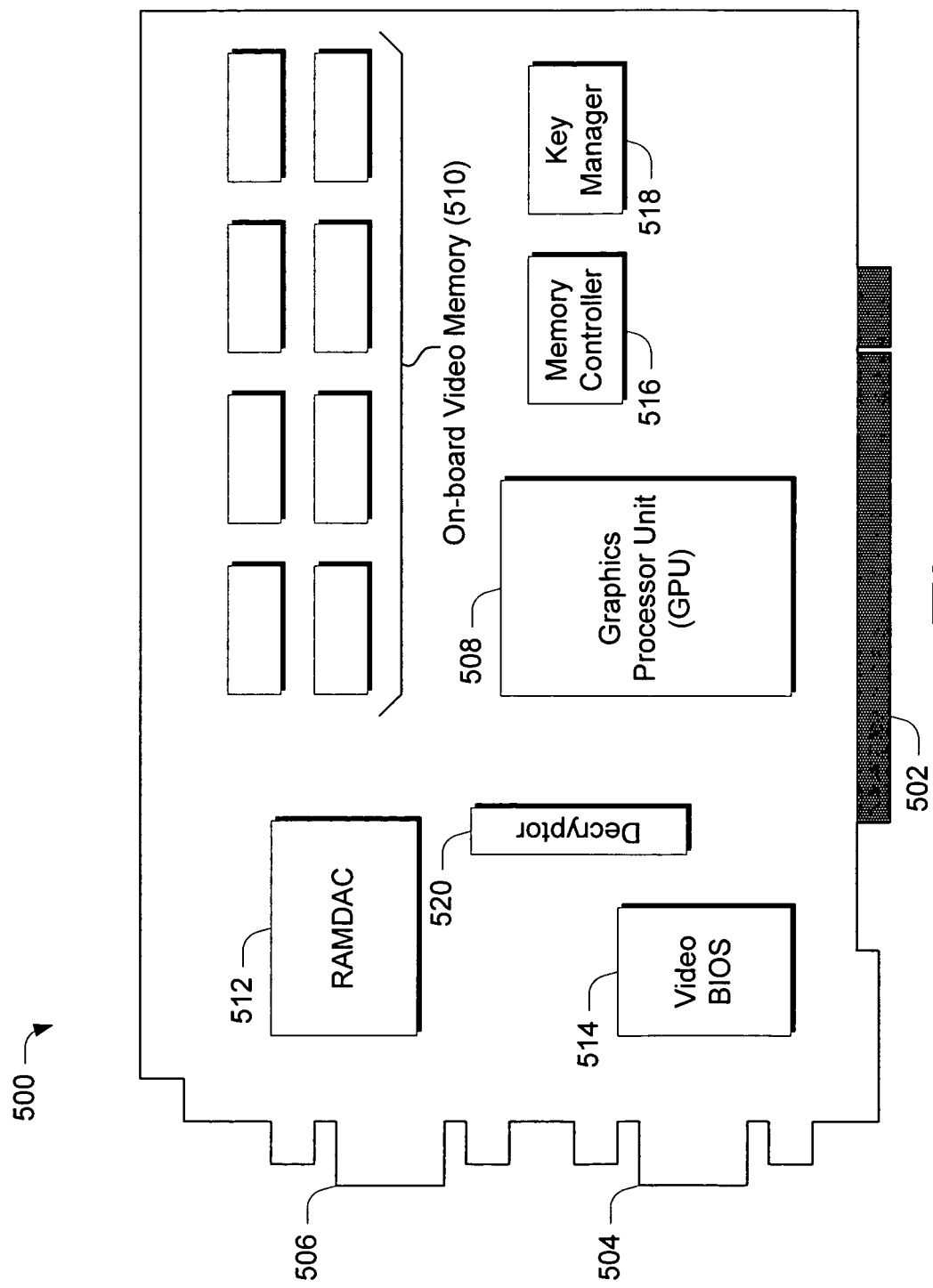
FIG. 5 is a block diagram that shows various components of an exemplary video or graphics in accordance with one embodiment.

FIG. 5 shows an exemplary video (or graphics) card 500 in accordance with one embodiment. Card 500 includes a bus connector 502 that snaps into a port on a typical computer. Video card 500 also includes a monitor connector 504 (e.g. a 15-pin plug) that receives a cable that connects to a monitor. Video card 500 can, but need not, include a digital video-out (e.g. DVI) socket 506 that can be used for sending video images to digital displays and the like.

Figure 1:
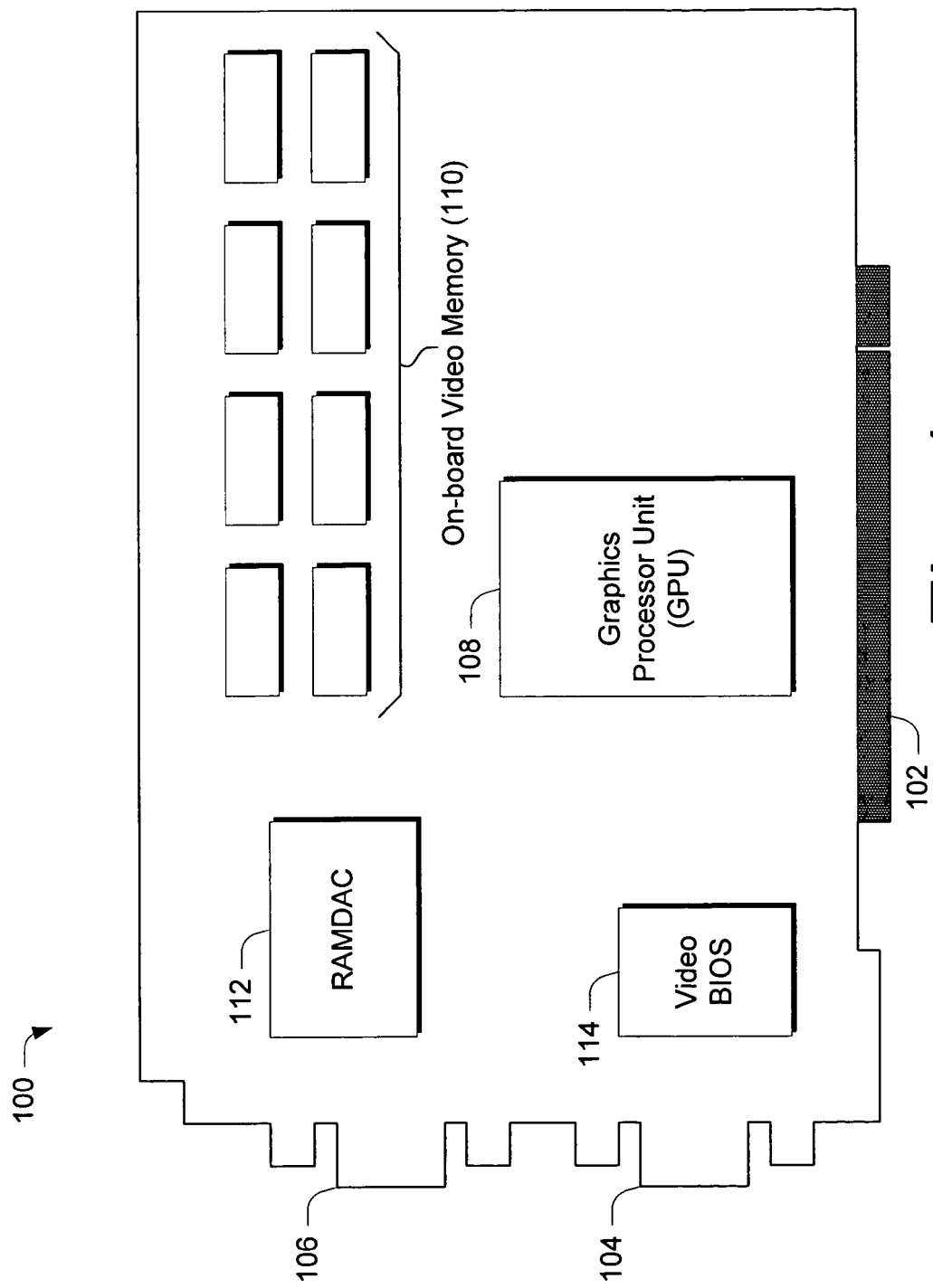
FIG. 1 is a block diagram that shows various components of an exemplary video or graphics card that is intended for use in a computer system.

Like the video card of FIG. 1, video card 500 comprises a graphics processor unit (GPU) 508, video memory 510, random access memory digital-to-analogue converter (RAMDAC) 512, and driver software which can be included in the Video BIOS 514.

GPU 508 is a dedicated graphics processing chip that controls all aspects of resolution, color depth, and all elements associated with rendering images on the monitor screen. The memory controller (sometimes integrated into the GPU) manages the memory on the video card. The computer's central processing unit or CPU (not shown) sends a set of drawing instructions and data, which are interpreted by the graphics card's proprietary driver and executed by the card's GPU 508. GPU 508 performs such operations as bitmap transfers and painting, window resizing and repositioning, line drawing, font scaling and polygon drawing. The GPU can then write the frame data to the frame buffer (or on-board video memory 510).

The information in the video memory frame buffer is an image of what appears on the screen, stored as a digital bitmap. RAMDAC 512 is utilized to convert the digital bitmap into a form that can be used for rendering on the monitor, as described above.

In addition to these components, in this embodiment, video card 500 comprises a memory controller 516 and a key manager 518. The video card can also include a decryptor 520. These components can be implemented in any suitable hardware, software, firmware or combination thereof.

Memory controller 516 receives encrypted data on the video card and decrypts the data into protected regions or portions of video memory 510. The decrypted data is now in a state in which it can be operated upon by the GPU 508. The memory controller can also be responsible for ensuring that data transfers on the video card are made between protected regions or regions that have a compatible degree of protection. That is, often times during processing of the data on the video card, the GPU 508 will operate on the data in the video memory (for example, by performing a blending operation) and will cause the resultant data to be written to a different video memory location. In this instance, there may be regions of video memory that are not protected or are protected at a different level. In this case, the memory controller can ensure that data transfers within the video card take place in a manner that ensures the protection of the unencrypted data. Examples of how this can be done are described below in more detail.

Key manager 518 controls encryption and decryption keys that are used to encrypt and decrypt data on the video card. In one implementation, key manager 518 comprises a separate chip. Key manager 518 is communicatively linked with the memory controller and can program the memory controller with the various encryption/decryption keys. Advantageously, communication between the key manager 518 and memory controller 516 takes place through an encrypted, authenticated communication channel thus ensuring that the key manager is the only entity that can program the memory controller.

The video card 500 can also include a decryptor 520 that is configured or configurable to decrypt data. For example, in some instances data that is unencrypted on the video card can be written to a memory region that is not protected. For example, such data may be written to a so-called "primary surface" or desk top surface that contains data that is used by the RAMDAC 512 for rendering an image on the monitor. In this case, it can be desirable to protect the unencrypted data so that it is not subject to attack. Accordingly, when the data is moved from a protected memory region to an unprotected memory region, the memory controller 516 can encrypt the data. In this example, the key manager 518 keeps track of and knows which keys are associated with the encrypted data in the unprotected memory region. When the encrypted data is to be provided to the RAMDAC 512, the key manager can then instruct the decryptor 520 on which key or keys to use to decrypt the encrypted data. The encrypted data is then provided to the decryptor 520, decrypted and then provided to the RAMDAC 512 for further processing.

Alternately, the decryptor can be eliminated and the RAMDAC 512 can be configured to perform the decryption functionality. In this case, the key manager 518 can instruct the RAMDAC on which keys to use to effectuate the decryption.

Figure 6:
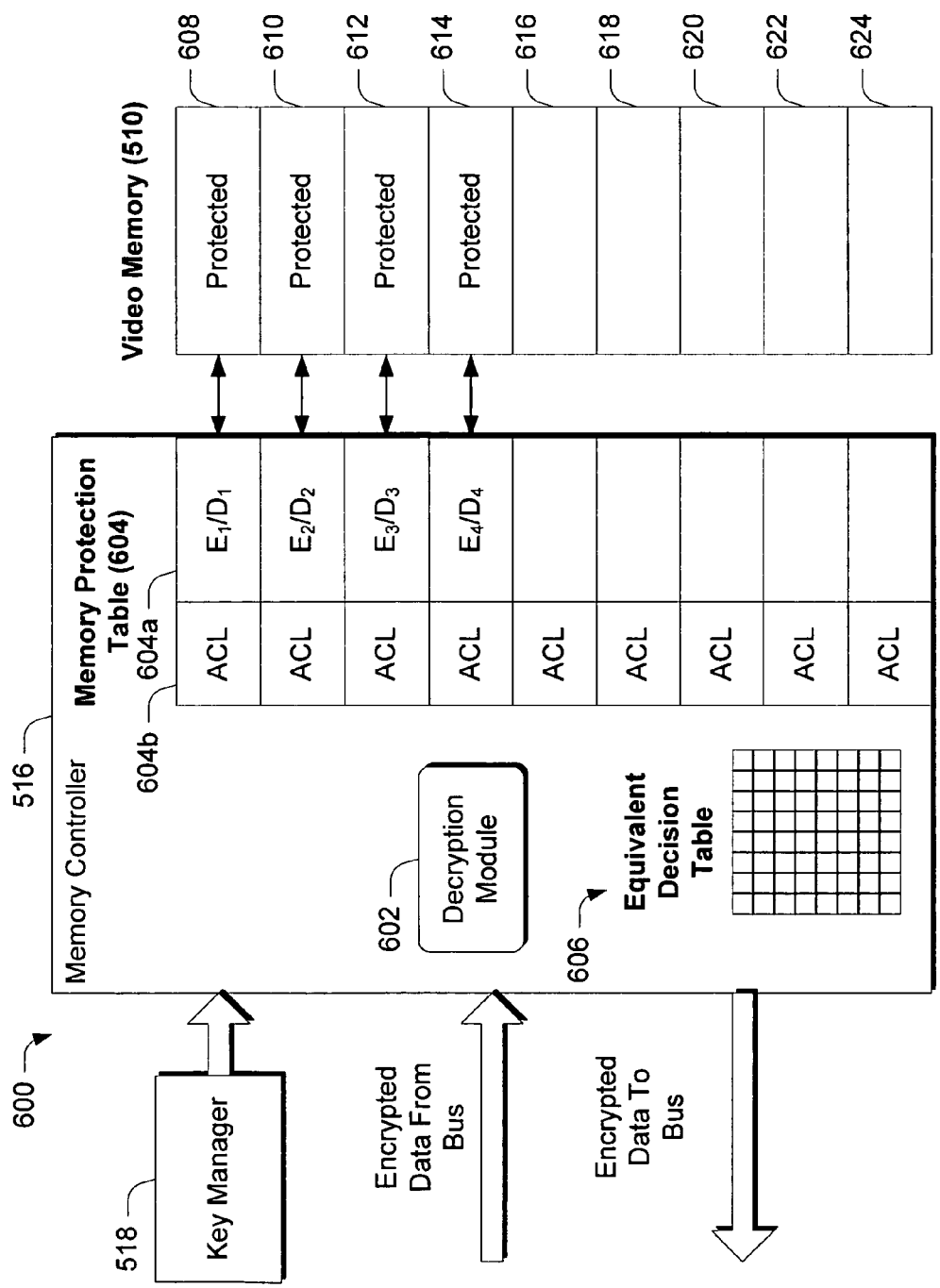
FIG. 6 is a block diagram that shows various components of the FIG. 5 video card.

FIG. 6 shows, in accordance with one embodiment, selected components of video card 500 (FIG. 5) in more detail generally at 600. There, memory controller 516 comprises a decryption module 602 that is configured to receive encrypted data from the bus (either the PCI or AGP in this example) and decrypt the data into video memory 510. In addition, a memory protection table 604 and an equivalent decision table 606 are provided.

In this example, memory protection table 604 includes a table portion 604a that contains entries that associate encryption/decryption key pairs with individual portions of the video memory 510. For example, encryption/decryption key pair $E_1/D_1$ are associated with memory portion 608, encryption/decryption key pair $E_2/D_2$ are associated with memory portion 610 and so on. When decrypted data in the video memory is to be written to system memory off of the video card, or any other time when the data on the video card is to be provided over the bus (e.g. the PCI or AGP bus), the CPU can cause the data to be encrypted with one of the encryption keys in table portion 604a. The encrypted data can then be placed onto the bus and provided, for example, into the system memory. When the memory controller 516 receives encrypted data from the system memory that has been encrypted, for example, with key $E_1$, decryption module 602 can locate the associated decryption key $D_1$ and decrypt the data into memory portion 608.

There can be a number of protected portions of video memory 510. In the present example, there are four protected portions designated 608–614. Unencrypted data in these protected portions can be processed by the GPU 508 (FIG. 5) in the usual manner. The protected portions of the video memory can be protected by an access control list. For example, memory protection table 604 includes a table portion 604b that can define an access control list for the various portions of video memory. Each portion of the video memory can have defined, in its associated access control list, which entities can access the memory portion. Thus, any attempted accesses by entities other than those contained in each memory portion's access control list will not be permitted by the memory controller.

Notice also that video memory 510 can include portions that are not protected. In this example, portions 616–624 are not protected. Accordingly, there are no encryption/decryption key pairs associated with these memory portions.

Figure 7:
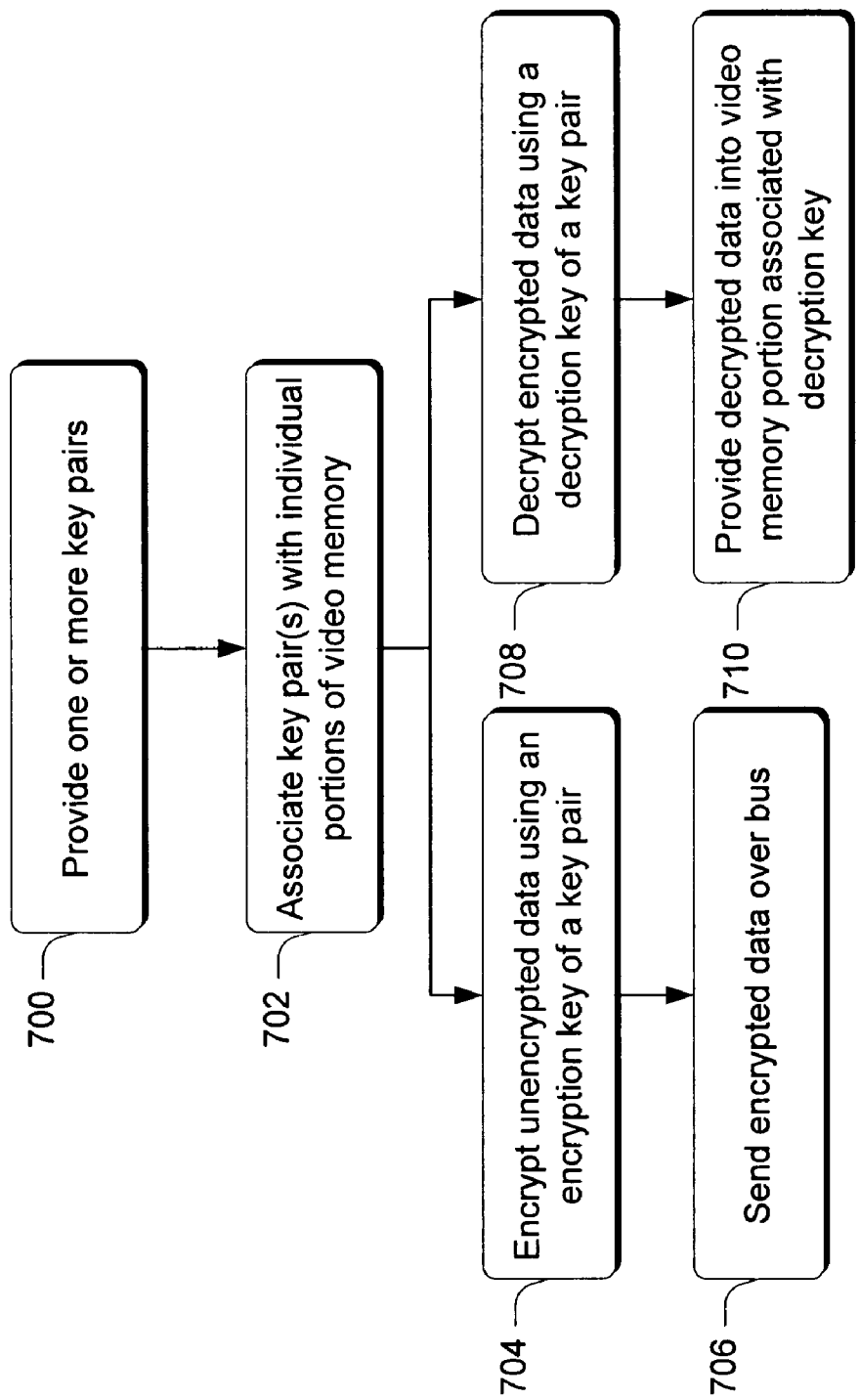
FIG. 7 is a flow diagram that describes steps in a method in accordance with one embodiment.

FIG. 7 is a flow diagram that describes steps in a method in accordance with one embodiment. The method can be implemented in any suitable hardware, software, firmware or combination thereof. In the illustrated example the method can be implemented, at least in part, with a system such as the one described in connection with FIG. 6.

Step 700 provides one or more keys pairs. Each key pair comprises an encryption key and an associated decryption key. Step 702 associates the key pair(s) with individual portions of video memory. Any suitable way can be utilized to associate the key pairs with the video memory portions. In the example of FIG. 6, a memory protection table is employed having multiple different entries. Individual table entries correspond to a particular key pair, and each table entry is associated with a portion of the video memory.

Step 704 encrypts unencrypted data using an encryption key of a key pair. For example, if unencrypted data in the video memory is to be written to the system memory, the CPU can cause the data to be encrypted with an encryption key that is associated with the video memory portion in which the data resides. Step 706 then sends the encrypted data over the bus to, for example, system memory.

Step 708, which follows from step 702, decrypts encrypted data using a decryption key of a key pair. For example, assume that data is encrypted with an encryption key and then provided into the system's memory. If the encrypted data is needed by the GPU, the data can be sent, by the CPU, to the video card. Upon receiving the encrypted data, the memory controller can locate a decryption key that is associated with the encryption key that was used for encrypting the data, and decrypt the data using the decryption key. Step 710 can then provide the data into an associated video memory portion that is associated with the decryption key. In this manner, data can be protected whenever it is to be provided over one or more of the system busses.

Equivalent decision table 606 (FIG. 6) is provided and is used by the memory controller 516 to ensure that data transfers within the video card's memory 510 are done in a manner that preserves the data's protection.

Figure 8:
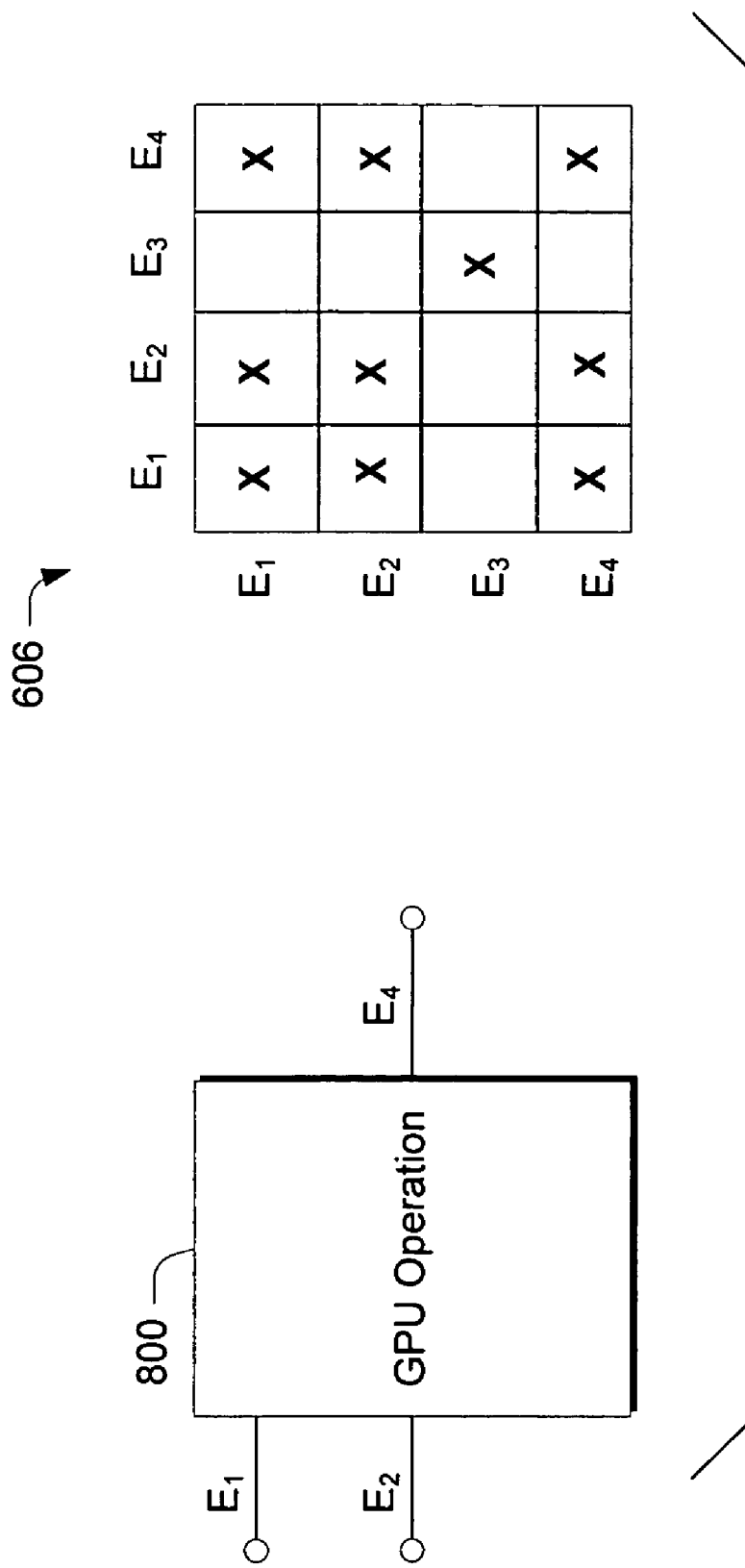
FIG. 8 is a block diagram that is useful in understanding certain aspects of the described embodiments.

As an example, consider FIG. 8. Often times when the GPU processes data on the video card, it moves the data from one memory location to another. For example, when the GPU performs a blending operation, it may take data from two different memory portions on the video card, blend the data and then write the resultant blended data to an all together different portion of the video memory. This is diagrammatically indicated by GPU Operation 800. Assume here that the GPU is performing an operation that has two inputs and one output. Each of the inputs corresponds to data that is stored in a protected portion of the video memory. In this example, one of the inputs is stored in a protected portion of video memory that is associated with encryption key $E_1$, and the other of the inputs is stored in a protected portion of video memory that is associated with encryption key $E_2$ (hence the $E_1$ and $E_2$ inputs). Once the operation is performed, the resultant output data is to be stored in a protected portion of the video memory associated with encryption key $E_4$. Now, wherever the GPU performs a memory transfer such as this, the memory controller 516 makes sure that it knows where the data came from and where the data is going to be stored. The memory controller then checks to ensure that the portions of video memory that the output data is to be stored in is consistent, in terms of the level of protection that the data is provided, with the protections afforded by the memory portions from which the constituent data came.

In this example, protection consistency can be enforced by ascertaining that the keys associated with the memory portions that contained the input data are the same as or equivalent to the key associated with the memory portion that is to hold the output data. Equivalence, in this example, can be determined based on the restrictions associated with the memory portions—that is—is there the same level of protection as between the different memory portions? Keys might not be equivalent if, for example, there are two different programs with two different pieces of content. For example, say that each content is encrypted with a different key and that the programs associated with the keys cannot share content. In this example, the encryption keys are not equivalent.

One way to ascertain the equivalence of keys associated with the various memory portions is to use an equivalent decision table such as table 606. There, the table defines a matrix that contains entries for each of the keys. An "X" in one of the matrix cells indicates that the keys are equivalent. For example, looking first at key $E_1$, this key is equivalent to keys $E_1$, $E_2$ and $E_4$. Thus, as shown best in FIG. 6, data can be freely transferred between memory portions 608, 610, and 614. Key $E_1$ is not, however, equivalent to key $E_3$. Thus, data cannot be transferred from memory portion 608 into memory portion 612. In the FIG. 8 example, since the input data comes from memory portions 608 and 610 and the resultant data is to be stored in memory portion 614, equivalency is not an issue and the operation can take place.

Figure 9:
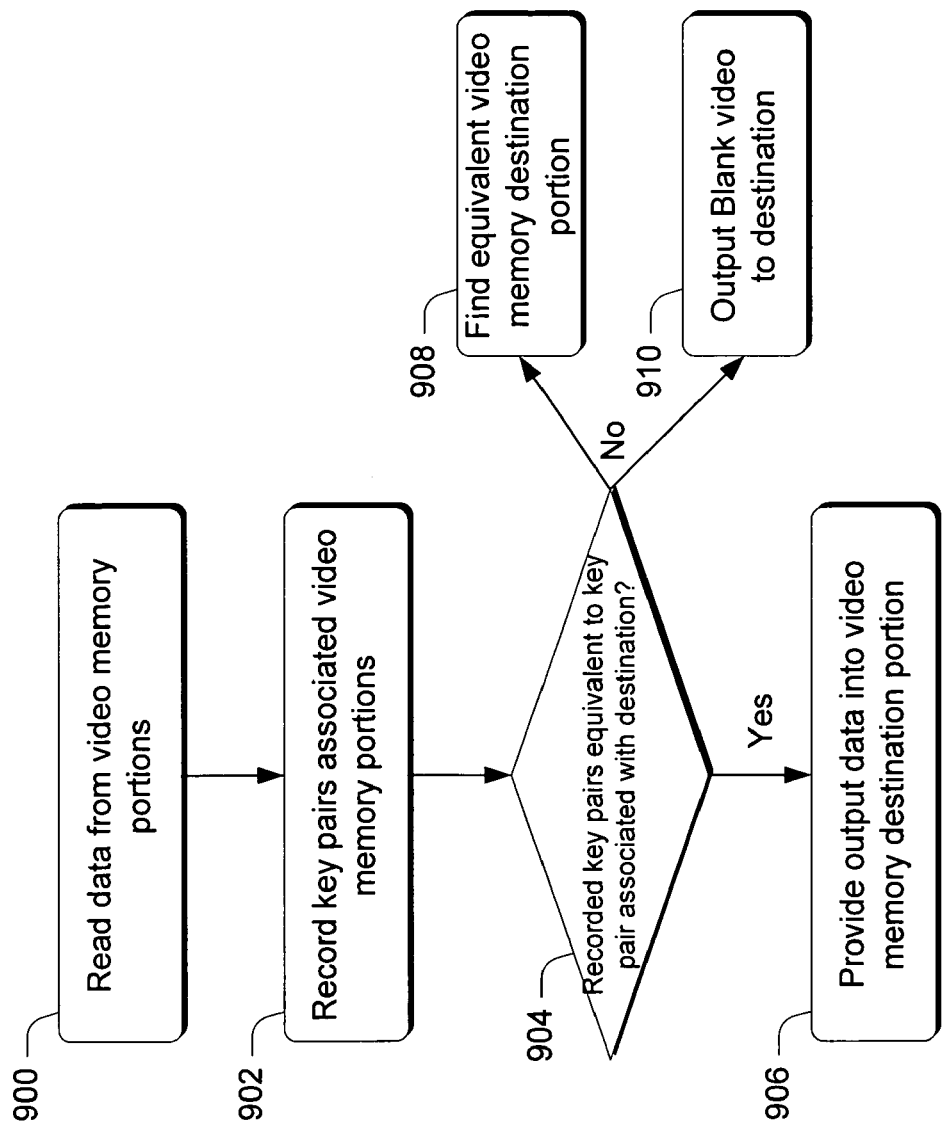
FIG. 9 is a flow diagram that describes steps in a method in accordance with one embodiment.

FIG. 9 is a flow diagram that describes steps in a method in accordance with one embodiment. The method can be implemented in any suitable hardware, software, firmware or combination thereof. In the illustrated example the method can be implemented, at least in part, with a system such as the one described in connection with FIG. 6.

Step 900 reads data from video memory portions on a video card. This step can be implemented by the GPU. Step 902 records key pairs associated with the video memory portions from which the data was read. This step can be implemented by the memory controller. Step 904 ascertains whether the recorded key pairs are equivalent to a key pair associated with a video memory portion that is to serve as a destination for the output data that results from the operation of the GPU. If the key pairs are equivalent, then step 906 provides the output data into the video memory destination portion. If, on the other hand, the key pairs are not equivalent, then step 908 finds a video memory destination portion that has an equivalent key pair or possibly step 910 outputs blank data to the specified memory destination.

Exemplary Second Video Card Embodiment

Figure 10:
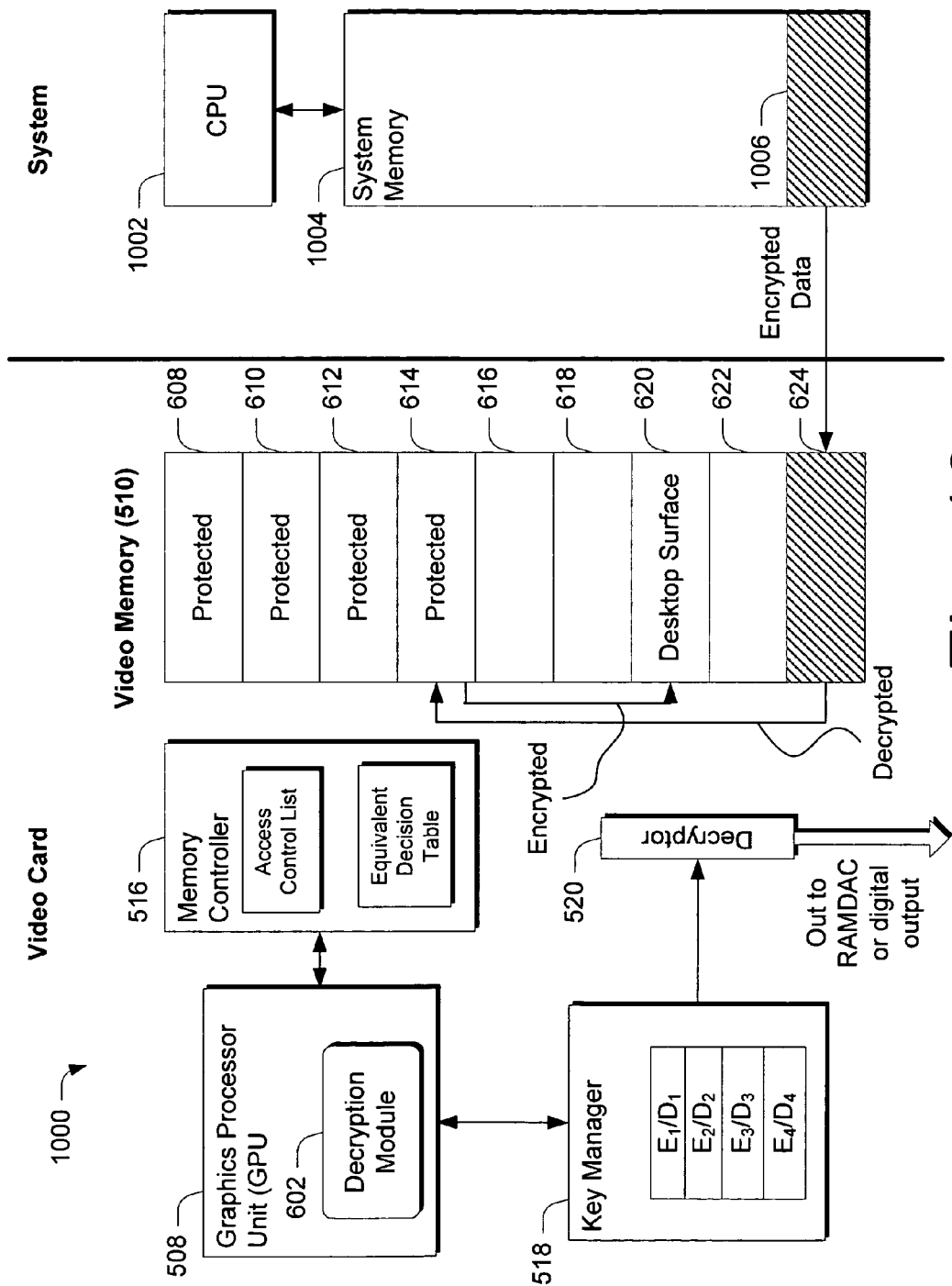
FIG. 10 is a block diagram that shows various components of a video card in accordance with one embodiment.

FIG. 10 shows an exemplary video (or graphics) card 1000 in accordance with another embodiment. Here, a portion of the figure is designated "Video Card" and a portion of the figure is designated "System". Such notation is intended to designate those components that reside, respectively, on the video card and the system. The "System" side of the figure includes a CPU 1002 and system memory 1004. Notice also that within the system memory 1004 is data 1006 that is intended for use on the video card 1000.

In this embodiment, data 1006 that resides in the system memory 1004 is unencrypted. CPU 1002 is configured to encrypt the data whenever it is to be sent over the bus to the video card. Such is typically accomplished by a CPU operation known as an "encrypt memory transfer". Thus, the encrypted data is now placed into an unprotected portion 624 of video memory 510. In this example, the data might be encrypted by the CPU with encryption key $E_1$.

Recall that the GPU 508 is configured to process unencrypted data. Accordingly, when the GPU 508 desires to process encrypted data in the unprotected portion of the video memory 510, the data should be decrypted. In this embodiment, GPU 508 contains decryption functionality which is represented in the figure by decryption module 602. Key manager 518 is communicatively linked with the GPU 508 and can program the GPU with the appropriate decryption keys. Of course, communication between the key manager and the GPU can take place via an authenticated link.

Accordingly, when the GPU wishes to operate upon encrypted data 1006 in the video memory, it can access the encrypted data and decrypt it into a protected portion of the video memory—here protected portion 614. The decryption can take place via an operation known as a "decrypt memory transfer". Now that this and other data is in protected portions of the video memory, the GPU can freely operate upon it in the usual manner.

In this embodiment, memory controller 516 can enforce memory protection by controlling access to the protected portions of the video memory via an access control list (not specifically shown). Thus, any time an entity such as the GPU 508 (or portions thereof) wishes to access the protected video memory portions, it will gain access via the memory controller 516. The access control list can describe what kind of protection the data has and which entities can access it. For example, the access control list can define which portions of the GPU can access the protected memory and one or more applications that "own" the protected memory and thus have access.

Now, when the data in the protected portions of the video memory is to be moved to an unprotected portion of the video memory, it can be encrypted. For example, assume that the data in memory portion 614 is to be moved to unprotected memory portion 620 (which, in this example, corresponds to the desk top surface that is to be processed by the RAMDAC for rendering). The GPU 508 can access the protected memory portion via the memory controller 516 and perform an encryption memory transfer operation to encrypt the data into the memory portion 620. When the encrypted data is to be provided to the RAMDAC for processing, the key manager 518 can communicate with decryptor 520 and provide the decryptor with the appropriate decryption key for decrypting the encrypted data in the memory portion 620. After decrypting the data, the decryptor 520 can provide the data to the RAMDAC for processing in the usual manner.

Notice also that memory controller 516 also comprises an equivalent decision table (not specifically designated). This table is similar, in concept, to the table discussed in connection with FIGS. 6 and 8. Here, however, the table is used to ensure that the access control lists that are associated with each of the memory portions of the video memory 510 are equivalent when data is to be transferred therebetween. For example, assume that data in memory portion 614 is to be transferred to memory portion 620. Accordingly, in this example, the memory controller 516 checks to ensure that the access control list associated with memory portion 614 is equivalent to the access control list associated with memory portion 620. If so, the data transfer is performed.

CONCLUSION

The various embodiments described above can ensure that data that is intended for use by a video card can be encrypted such that anytime the data is provided onto a bus (e.g. the PCI or AGP bus) between the video card and the computer system, the data is encrypted. Thus, snooping devices or rogue applications that acquire the bus cannot access the data and thus steal the data in its unencrypted form. Accordingly, another level of protected can be provided for content that is to be processed by the system's video card.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A video card comprising:
   a graphics processor unit (GPU) for processing data that is to be rendered on a monitor, the GPU comprising encryption and decryption functionality sufficient to encrypt and decrypt data on the video card;
   memory operably associated with the GPU for holding data that is to be or has been processed by the GPU, the memory comprising protected and unprotected portions;
   a display converter for converting digital data to analog signals for use in rendering the data on the monitor; and
   a memory controller configured to protect the protected portions of the video memory, wherein the memory controller comprises one or more access control lists that are utilized to protect the protected portions of the memory and wherein the access control lists define entities that can access the protected portions of the video memory, wherein the memory controller comprises a memory protection table that includes a table portion that contains entries that associate encryption/decryption key pairs with individual portions of the memory.

2. The video card of claim 1 further comprising a key manager on the video card configured to program the GPU with the encryption/decryption functionality.

3. The video card of claim 1, wherein the GPU is configured to decrypt data in unprotected portions of the memory into protected portions of the memory.

4. The video card of claim 1, wherein the GPU is configured to encrypt data in protected portions of the memory into unprotected portions of the memory.

5. A method comprising:
   providing a graphics processor unit (GPU) on a video card for processing data that is to be rendered on a monitor, the GPU comprising encryption and decryption functionality sufficient to encrypt and decrypt data on the video card;
   providing memory, on the video card, operably associated with the GPU for holding data that is to be or has been processed by the GPU, the memory comprising protected and unprotected portions;
   providing, on the video card, a display converter for converting digital data to signals for use in rendering the data on the monitor; and
   providing, on the video card, a memory controller configured to protect the protected portions of the video memory, wherein the memory controller comprises one or more access control lists that are utilized to protect the protected portions of the memory and wherein the access control lists define entities that can access the protected portions of the video memory,
   wherein the memory controller comprises a memory protection table that includes a table portion that contains entries that associate encryption/decryption key pairs with individual portions of the memory.

6. The method of claim 5 further comprising providing a key manager on the video card configured to program the GPU with the encryption/decryption functionality.

7. The method of claim 5, wherein providing the GPU comprises providing a GPU configured to decrypt data in unprotected portions of the memory into protected portions of the memory.

8. The method of claim 5, wherein providing the GPU comprises providing a GPU configured to encrypt data in protected portions of the memory into unprotected portions of the memory.

9. A system comprising:
   means for processing data that is to be rendered on a monitor, said means for processing comprising encryption and decryption functionality sufficient to encrypt and decrypt data on the video card;
   memory means, operably associated with the means for processing, for holding data that is to be or has been processed by the GPU, the memory means comprising protected and unprotected portions;
   means for converting digital data to analog signals for use in rendering the data on the monitor; and
   means for protecting the protected portions of the video memory, wherein the means for protecting comprises one or more access control lists that are utilized to protect the protected portions of the memory means and wherein the access control lists define entities that can access the protected portions of the video memory,
   wherein the means for protecting comprises a table that includes a table portion that contains entries that associate encryption/decryption key pairs with individual portions of the memory means.

10. The system of claim 9 further comprising means for programming the GPU with the encryption/decryption functionality.

11. The system of claim 9, wherein the means for processing data is configured to decrypt data in unprotected portions of the memory means into protected portions of the memory means.

12. The system of claim 9, wherein the means for processing data is configured to encrypt data in protected portions of the memory means into unprotected portions of the memory means.

* * * * *